United States Patent
Zawilinski et al.

(10) Patent No.: US 8,651,806 B2
(45) Date of Patent: Feb. 18, 2014

(54) AIR TURBINE STARTER INLET HOUSING ASSEMBLY AIRFLOW PATH

(75) Inventors: David J. Zawilinski, W. Granby, CT (US); Jeffrey M. Makulec, Rockford, IL (US); Matthew Slayter, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 784 days.

(21) Appl. No.: 12/858,415

(22) Filed: Aug. 17, 2010

(65) Prior Publication Data

US 2012/0042659 A1 Feb. 23, 2012

(51) Int. Cl.
 *F01D 1/04* (2006.01)
 *F01D 25/24* (2006.01)
(52) U.S. Cl.
 USPC ..................... 415/191; 415/182.1
(58) Field of Classification Search
 USPC ............... 415/191, 182.1
 See application file for complete search history.

(56) References Cited

U.S. PATENT DOCUMENTS

| | | | |
|---|---|---|---|
| 4,885,909 A | 12/1989 | Rodgers | |
| 4,899,534 A | 2/1990 | Sorenson | |
| 4,916,893 A | 4/1990 | Rodgers | |
| 5,042,963 A * | 8/1991 | Sorenson et al. | 415/18 |
| 6,142,418 A | 11/2000 | Weber et al. | |
| 6,305,156 B1 | 10/2001 | Lui | |
| 6,318,958 B1 | 11/2001 | Giesler et al. | |
| 6,415,595 B1 | 7/2002 | Wilmot, Jr. et al. | |
| 6,623,238 B2 | 9/2003 | Langston et al. | |
| 6,681,579 B2 | 1/2004 | Lane et al. | |
| 6,684,898 B2 | 2/2004 | Wiggins et al. | |
| 6,796,527 B1 | 9/2004 | Munoz et al. | |
| 6,817,575 B1 | 11/2004 | Munoz et al. | |
| 6,892,455 B1 * | 5/2005 | Feest | 29/895.33 |
| 6,969,235 B2 | 11/2005 | Feest | |
| 6,969,236 B2 | 11/2005 | Giesler et al. | |
| 7,033,134 B2 | 4/2006 | Bristol et al. | |
| 7,186,081 B2 | 3/2007 | Giesler et al. | |
| 7,232,289 B2 | 6/2007 | Dong et al. | |
| 7,250,688 B2 | 7/2007 | Thomson et al. | |
| 2005/0058542 A1 * | 3/2005 | Kruegel et al. | 415/191 |
| 2009/0199567 A1 * | 8/2009 | Gockel et al. | 60/788 |

* cited by examiner

*Primary Examiner* — Nathaniel Wiehe
*Assistant Examiner* — Aaron Jagoda
(74) *Attorney, Agent, or Firm* — Carlson, Gaskey & Olds, P.C.

(57) ABSTRACT

An inlet housing assembly for an Air Turbine Starter includes an outer flowpath curve of an inlet flowpath defined by a multiple of arcuate surfaces in cross-section.

9 Claims, 11 Drawing Sheets

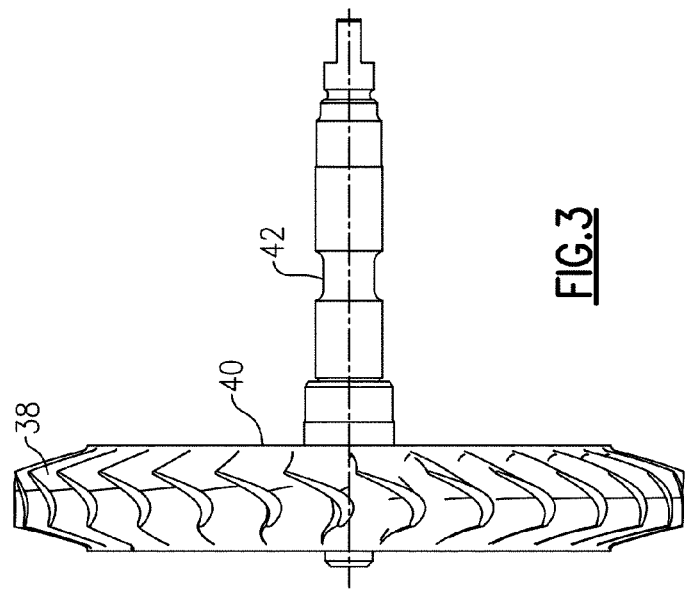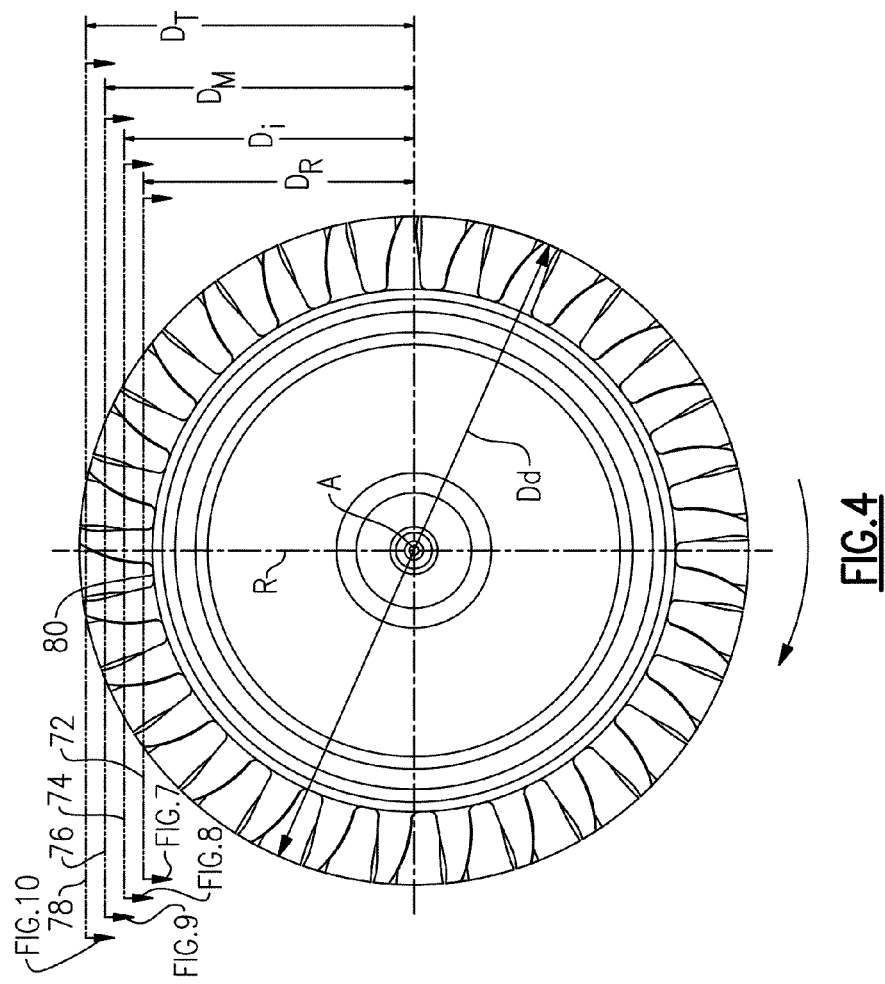

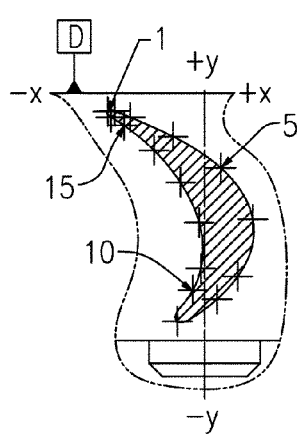
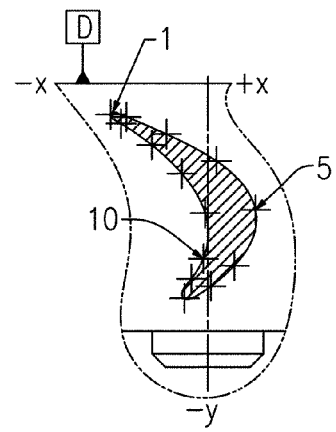
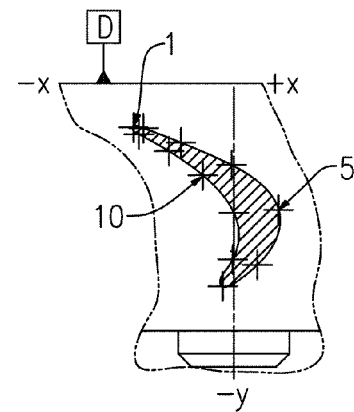
FIG.7  FIG.8  FIG.9
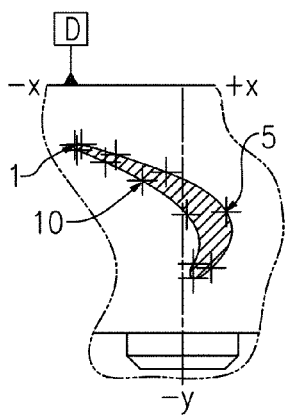
FIG.10
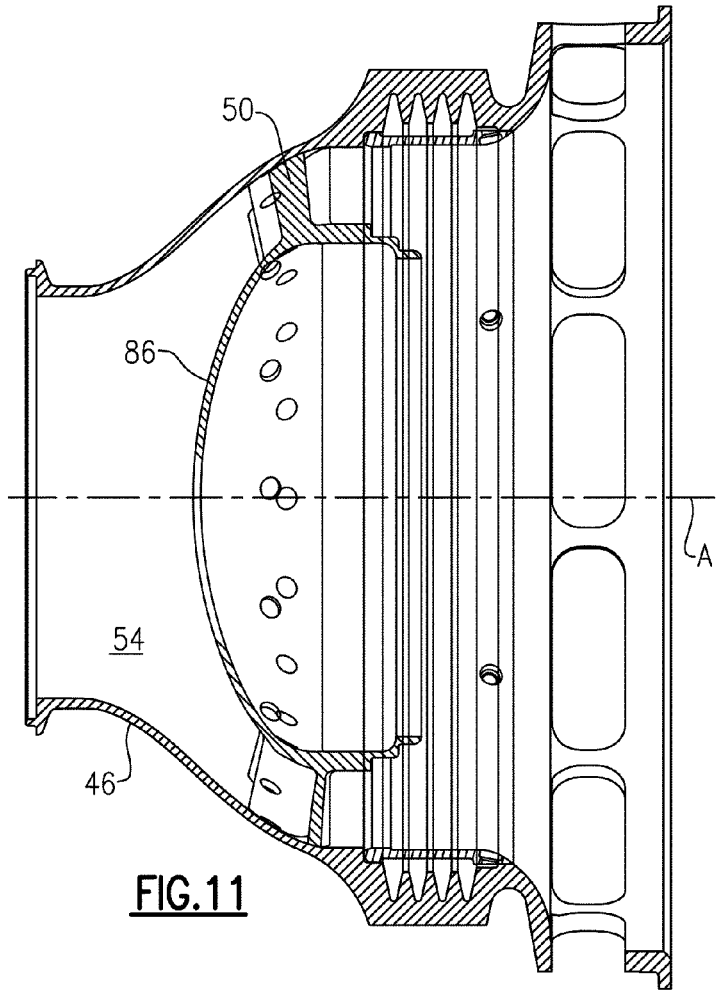
FIG.11

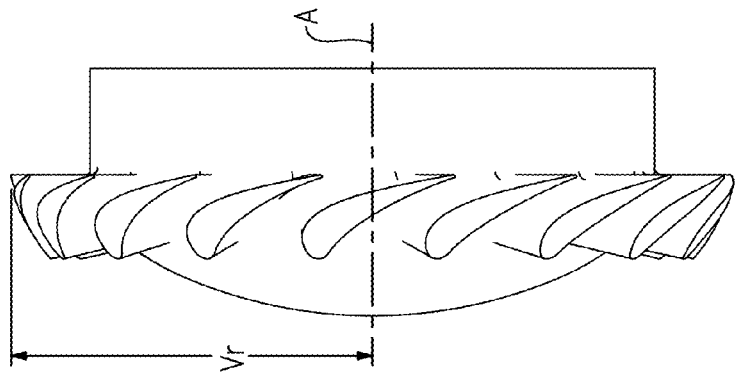
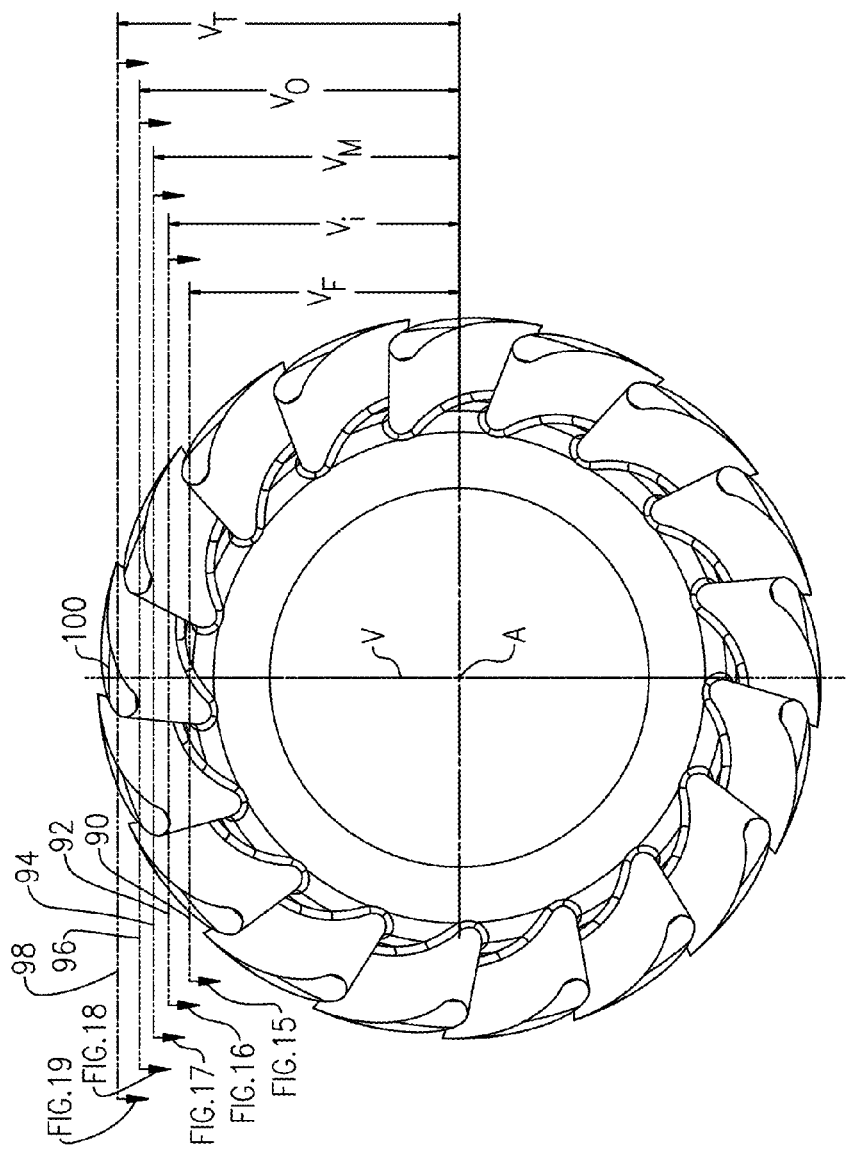

AIR TURBINE STARTER INLET HOUSING ASSEMBLY AIRFLOW PATH

BACKGROUND

The present disclosure relates to an air-turbine starter used to start gas turbine engines, and more particularly to an aerodynamic flowpath thereof.

Many relatively large turbine engines, including turbofan engines, may use an air turbine starter (ATS) to initiate gas turbine engine rotation. The ATS is typically mounted on the accessory gearbox which, in turn, is mounted on the engine or airframe. Consequently, the ATS is installed in the aircraft at all times even though active operation may occur only for a minute or so at the beginning of each flight cycle, along with occasional operation during engine maintenance activities.

The ATS generally includes a turbine section coupled to an output section within a housing. The turbine section is coupled to a high pressure fluid source, such as compressed air, to drive the output section through a gear system. Thus, when the high pressure fluid source impinges upon the turbine section, the output section powers the gas turbine engine.

SUMMARY

An inlet housing assembly for an Air Turbine Starter according to an exemplary aspect of the present disclosure includes an outer flowpath curve of an inlet flowpath defined by a multiple of arcuate surfaces in cross-section.

An inlet housing assembly for an Air Turbine Starter according to an exemplary aspect of the present disclosure includes an inlet housing which defines an outer flowpath curve of an inlet flowpath. The outer flowpath curve defined at least partially by a multiple of arcuate surfaces in cross-section. A nozzle defines an inner flowpath curve of the inlet flowpath, the inner flowpath curve at least partially defined by a central dome shape.

An Air Turbine Starter according to an exemplary aspect of the present disclosure includes an inlet housing which at least partially surrounds a turbine rotor to define an outer flowpath curve of an inlet flowpath in communication with the turbine rotor. The outer flowpath curve defined at least partially by a multiple of arcuate surfaces in cross-section. A nozzle upstream of the turbine rotor, the nozzle defines an inner flowpath curve of the inlet flowpath in communication with the turbine rotor. The inner flowpath curve at least partially defined by a central dome shape.

A method of assembling an Air Turbine Starter according to an exemplary aspect of the present disclosure includes fixing a turbine nozzle that includes a central dome shape with a multiple of turbine vanes which extend in a radial manner therefrom into an inlet housing. Rotationally mounting a turbine rotor into said inlet housing downstream of the turbine nozzle, the inlet housing at least partially surrounds the turbine rotor, the inlet housing defines an outer flowpath curve of an inlet flowpath in communication with the turbine rotor, the outer flowpath curve defined at least partially by a multiple of arcuate surfaces in cross-section, the nozzle defines an inner flowpath curve of the inlet flowpath in communication with the turbine rotor, the inner flowpath curve at least partially defined by the central dome shape.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is a side view of the turbine rotor;

FIG. 4 is a front side view of the turbine rotor;

FIGS. 7-10 are profile sectional views of the rotor blade of the turbine rotor;

FIG. 11 is a sectional side view of an inlet housing assembly for the ATS;

FIG. 13 is a front view of the nozzle;

FIG. 14 is a side view of the nozzle;

DETAILED DESCRIPTION

Figure 1:
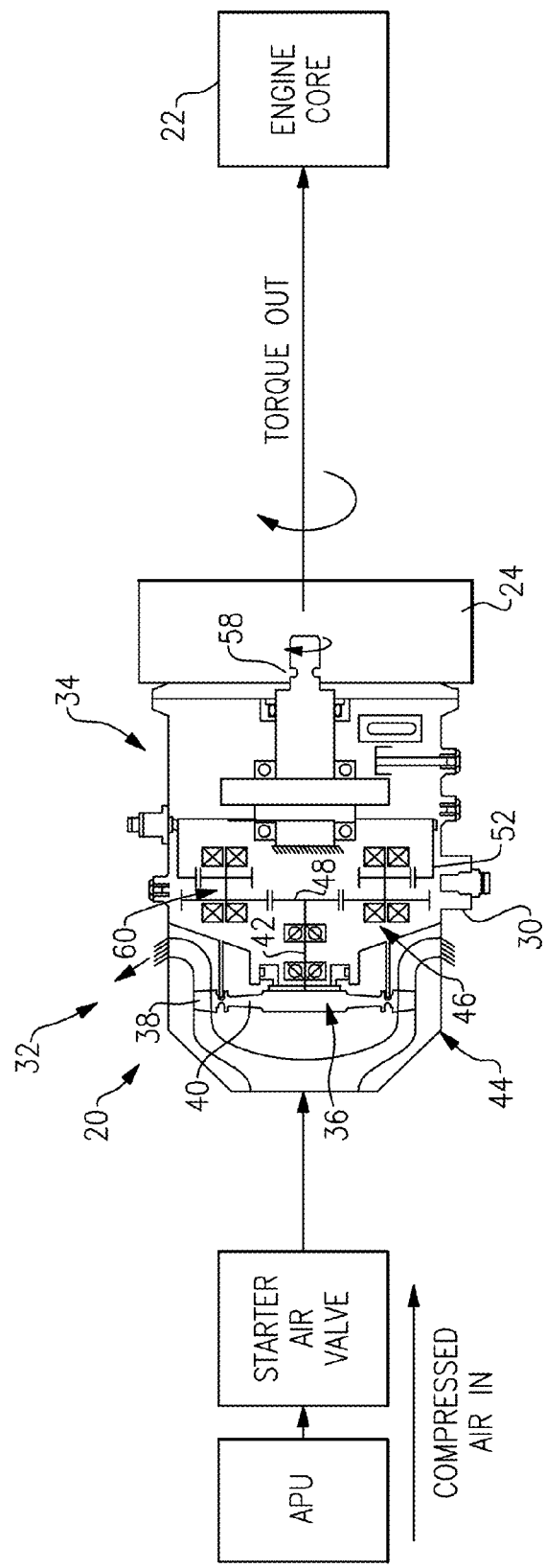
FIG. 1 is a general schematic view of an air turbine starter (ATS) used to initiate the rotation of a larger turbine through an accessory gearbox.

FIG. 1 schematically illustrates an exemplary air turbine starter (ATS) 20 that is used to initiate the rotation of a larger gas turbine 22, such as a turbofan engine through an accessory gearbox 24. It should be appreciated that the present application is not limited to use in conjunction with a specific type of rotating machine. Thus, although the present application is, for convenience of explanation, depicted and described as being implemented in an air turbine starter, it should be appreciated that it can be implemented in numerous other machines including, but not limited to, a gas turbine engine, an auxiliary power unit, a turbo charger, a super charger, an air cycle machine, an alternator, an electric motor, an electric generator, an integrated constant speed drive generator and gearboxes of various types with an interface which is to be closely controlled.

Figure 2:
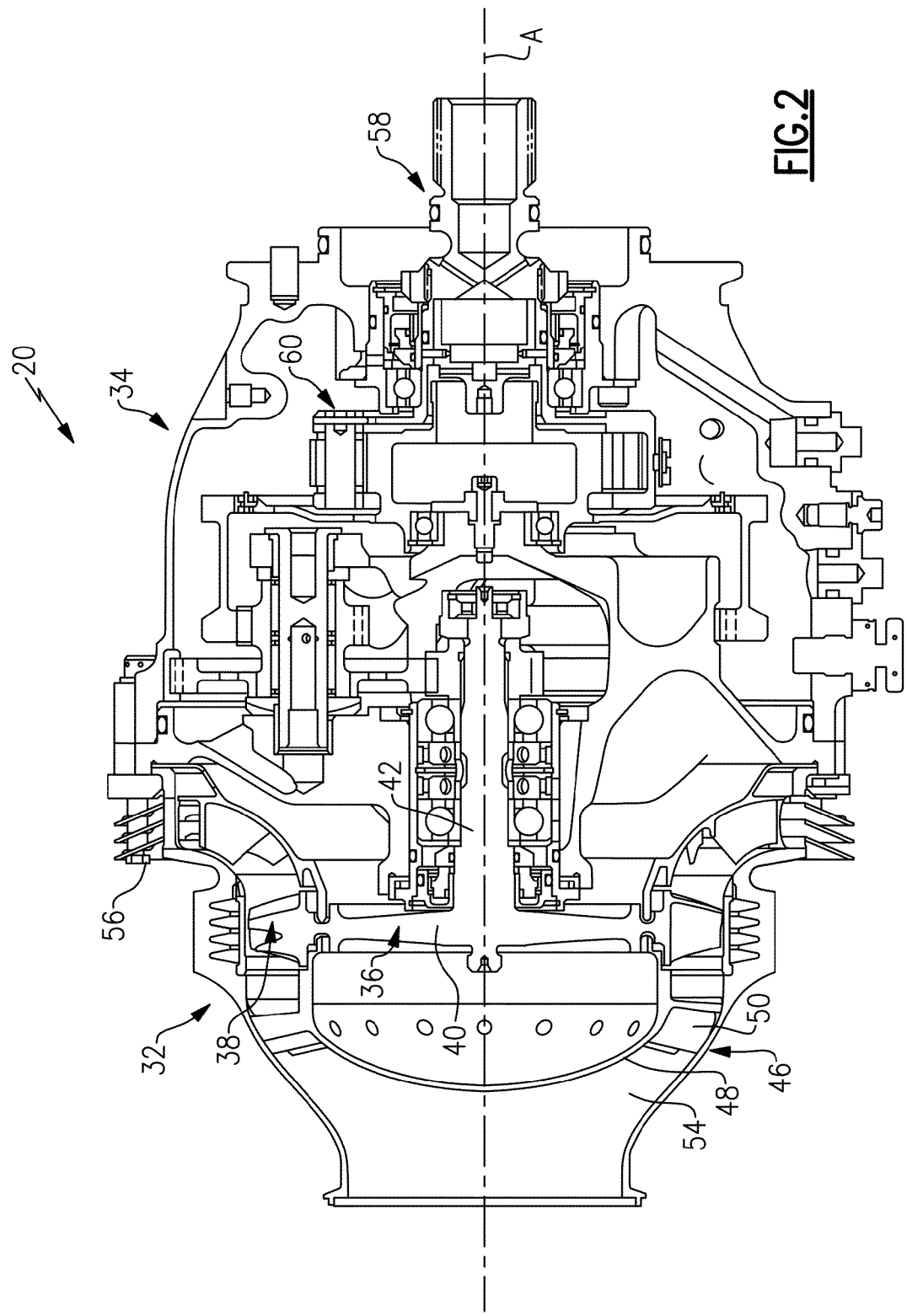
FIG. 2 is a side sectional view of the ATS.
Figure 5:
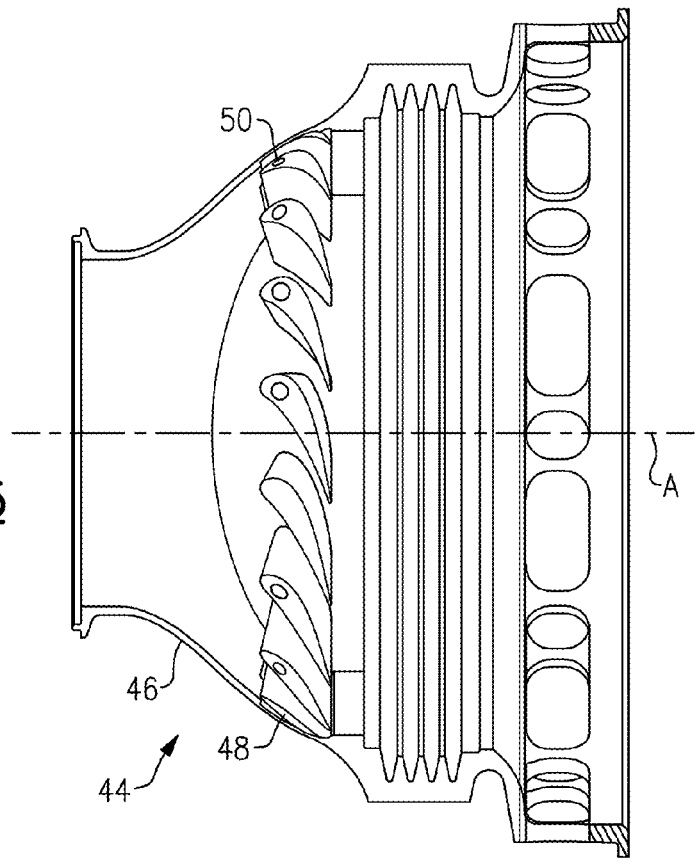
FIG. 5 is a sectional side view of an inlet housing assembly for the ATS.

The ATS 20 generally includes a housing assembly 30 that includes at least a turbine section 32 and an output section 34 (FIG. 2). The turbine section 32 includes a turbine wheel 36 with a plurality of turbine blades 38, a hub 40, and a turbine rotor shaft 42 (FIGS. 3 and 4). The turbine blades 38 of the turbine wheel 36 are located downstream of an inlet housing assembly 44 which includes an inlet housing 46 which contains a nozzle 48 (FIG. 5). The nozzle 48 includes a plurality of vanes 50 which direct compressed air flow from an inlet 52 through an inlet flowpath 54. The compressed air flows past the vanes 50 drives the turbine wheel 36 then is exhausted through an outlet 56.

The turbine wheel 36 is driven by the compressed airflow such that the turbine rotor shaft 42 may mechanically drive a starter output shaft 58 though a gear system 60 (illustrated schematically) such as a planetary gear system. The ATS 20 thereby transmits relatively high loads through the gear system 60 to convert the pneumatic energy from the compressed air into mechanical energy to, for example, rotate the gas turbine 22 for start.

The turbine blades 38 of the turbine wheel 36 and the vanes 50 of the nozzle 48—both of which are defined herein as airfoils—may be defined with computational fluid dynamics (CFD) analytical software and are optimized to meet the specific performance requirements of a specific air turbine starter. Some key engine characteristics which must be known to design a ATS are the engine core inertia (the portion of the engine which is actually rotated by the ATS), the engine core drag torque as a function of speed, other drag torques (such as from gearbox mounted accessories) as a function of speed, and the maximum time allowed for the start. Values of these parameters are needed for the range of ambient starting temperature conditions. From these, the ATS a preferred internal gear ratio for the starter and, using the CFD tools, the optimum airfoil shape which is most efficient can be determined for each particular ATS. Depending on the values of the original requirements, the airfoil shape will be different, and will be optimized to perform with highest efficiency at the design speed of the starter.

Characteristics of the airfoil shape may change from one airfoil shape to another and may include, but are not limited to, curvature, maximum thickness, axial chord length, twist, taper from root to tip, radius of the leading edge, radius of the trailing edge, straightness of the leading and trailing edge from root to tip, etc. It is possible to directly scale up or scale down the airfoil shape to meet a different set of engine starting requirements, however, if the entire flowpath geometry, to include the rotor blades 38, vanes 50 and inlet flowpath 54 is not also scaled using the same scale factor, the delivered performance of the ATS may not properly scale.

The shape of the airfoils may be dimensionally defined by a set of cross sections positioned at increasing radial locations starting, for example, below the root section of the airfoil and to extend beyond the tip of the airfoil. When connected by continuous smooth surfaces from the root to the tip, the shape of the airfoil is created such as with solid modeling software such as Unigraphics. The solid model may be used directly by a manufacturer to manufacture the airfoils. Further dimensional definition for inspection purposes may be defined by a set of points in, for example, Cartesian coordinates along the boundary of each of the blade cross-sections. The Cartesian coordinate system is typically oriented such that X is the tangential direction, Y is the axial direction, and Z is the radial direction.

Figure 6:
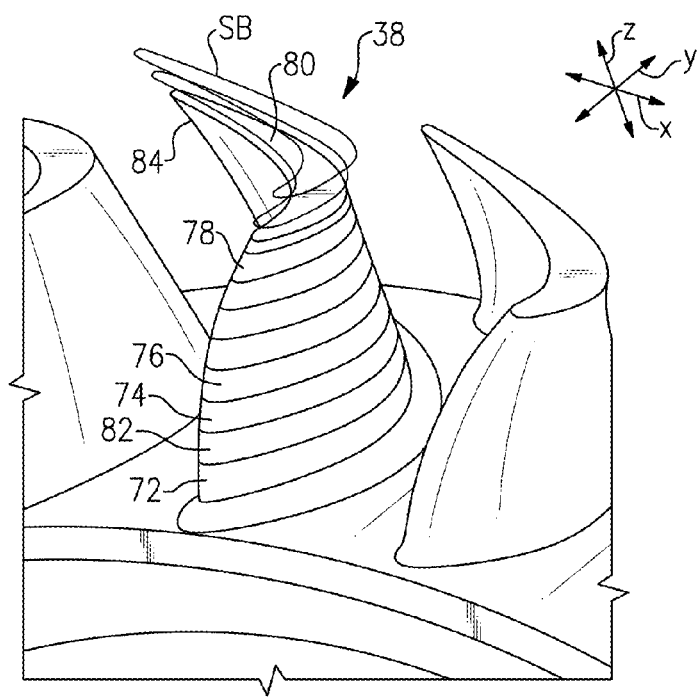
FIG. 6 is a perspective view of a rotor blade of the turbine rotor shaft.

FIG. 4 illustrates sections of the turbine blade 38 which includes the inventive airfoil profile sections designated herein. Each turbine blade 38 can generally be divided into a root region 72, an inboard region 74, a main region 76, and a tip region 78. The root, inboard, main, and tip regions 72-78 define the span of the turbine blade 38 and define a blade radius R between the axis of rotation A and a distal blade tip 80. It should be understood that various alternative or additional profile sections may be defined intermediate any of the sections defined herein when connected by a smooth surface. That is, the airfoil portions may be manufactured using a solid model which may alternatively or additionally be described with additional sections defined above the blade tip and below the blade root. So regions 72-78 are representative of the span of the airfoil but additional definition may be provided with sections which do not fall within the span but may be defined through a solid model. The same methodology applies to the multiple of vanes The turbine blade 38 defines a leading edge 82 and a trailing edge 84, which define the chord of the turbine blade 38 (FIG. 6).

Because of the difficulty involved in giving an adequate word description of the particular blade airfoil profile section being described, coordinates for one non-limiting embodiment of the airfoil profile section are set forth in Table I-1; Table II-1; Table III-1; and Table IV-1 which represent sections taken within the root region 72 (FIG. 7), the inboard region 74 (FIG. 8), the main region 76 (FIG. 9), and the tip region 78 (FIG. 10). Another non-limiting embodiment of the airfoil profile sections are set forth in Table I-2; Table II-2; Table III-2; and Table IV-2.

TABLE I-1

BLADE CONTOUR COORDINATES

| No. | X-Basic | Y-Basic |
|---|---|---|
| 1 | −.3659 | −.0707 |
| 2 | −.3396 | −.0685 |
| 3 | −.2811 | −.0925 |
| 4 | −.1194 | −.1653 |
| 5 | .0610 | −.2834 |
| 6 | .1819 | −.4778 |
| 7 | .1244 | −.6944 |
| 8 | .0471 | −.7799 |
| 9 | −.1031 | −.8637 |
| 10 | −.0446 | −.7454 |
| 11 | −.0142 | −.6636 |
| 12 | −.0207 | −.4908 |
| 13 | −.0916 | −.3386 |
| 14 | −.1910 | −.2175 |
| 15 | −.3408 | −.1232 |
| 16 | −.3537 | −.0917 |

TABLE I-2

BLADE CONTOUR COORDINATES

| No. | X-Basic | Y-Basic |
|---|---|---|
| 1 | −.3207 | .0749 |
| 2 | −.1990 | .1148 |
| 3 | −.0236 | .2055 |
| 4 | .1401 | .3720 |
| 5 | .1334 | .5879 |
| 6 | .0626 | .6773 |
| 7 | .0239 | .7469 |
| 8 | −.0925 | .7688 |
| 9 | −.0767 | .7179 |
| 10 | −.0274 | .6434 |
| 11 | −.0038 | .5574 |
| 12 | −.0365 | .3833 |
| 13 | −.1299 | .2439 |
| 14 | −.2392 | .1440 |

TABLE II-1

BLADE CONTOUR COORDINATES

| No. | X-Basic | Y-Basic |
|---|---|---|
| 1 | −.3668 | −.1176 |
| 2 | −.3075 | −.1266 |
| 3 | −.1558 | −.1919 |
| 4 | .0330 | −.2936 |
| 5 | .1803 | −.4779 |
| 6 | .1003 | −.6890 |
| 7 | .0116 | −.7666 |
| 8 | −.0882 | −.8126 |
| 9 | −.0621 | −.7389 |
| 10 | −.0168 | −.6630 |
| 11 | −.0097 | −.4901 |

TABLE II-1-continued

BLADE CONTOUR COORDINATES

| No. | X-Basic | Y-Basic |
|---|---|---|
| 12 | −.0977 | −.3408 |
| 13 | −.2117 | −.2326 |
| 14 | −.3274 | −.1524 |

TABLE II-2

BLADE CONTOUR COORDINATES

| No. | X-Basic | Y-Basic |
|---|---|---|
| 1 | −.3209 | .1167 |
| 2 | −.2339 | .1402 |
| 3 | −.0622 | .2195 |
| 4 | .1332 | .3724 |
| 5 | .1191 | .5847 |
| 6 | .0362 | .6673 |
| 7 | −.0594 | .7274 |
| 8 | −.0774 | .7246 |
| 9 | −.0832 | .7144 |
| 10 | −.0370 | .6398 |
| 11 | .0004 | .5583 |
| 12 | −.0323 | .3831 |
| 13 | −.1483 | .2506 |
| 14 | −.2664 | .1639 |

TABLE III-1

BLADE CONTOUR COORDINATES

| No. | X-Basic | Y-Basic |
|---|---|---|
| 1 | −.3790 | −.1674 |
| 2 | −.3410 | −.1699 |
| 3 | −.1997 | −.2239 |
| 4 | −.0083 | −.3085 |
| 5 | .1697 | −.4786 |
| 6 | .0887 | −.6865 |
| 7 | −.0411 | −.7678 |
| 8 | −.0044 | −.6658 |
| 9 | .0003 | −.4895 |
| 10 | −.1165 | −.3476 |
| 11 | −.2447 | −.2566 |
| 12 | −.3586 | −.1926 |

TABLE III-2

BLADE CONTOUR COORDINATES

| No. | X-Basic | Y-Basic |
|---|---|---|
| 1 | −.3327 | .1637 |
| 2 | −.2775 | .1720 |
| 3 | −.1124 | .2376 |
| 4 | .1154 | .3736 |
| 5 | .1130 | .5833 |
| 6 | .0258 | .6634 |
| 7 | −.0346 | .6849 |
| 8 | −.0293 | .6427 |
| 9 | .0162 | .5618 |
| 10 | −.0352 | .3832 |
| 11 | −.1818 | .2627 |
| 12 | −.3052 | .1922 |

TABLE IV-1

BLADE CONTOUR COORDINATES

| No. | X-Basic | Y-Basic |
|---|---|---|
| 1 | −.4070 | −.2260 |
| 2 | −.3820 | −.2230 |
| 3 | −.2520 | −2620 |
| 4 | −.0622 | −.3280 |
| 5 | .1657 | −.4789 |
| 6 | .1083 | −.6908 |
| 7 | .0400 | −.7291 |
| 8 | .0400 | −.6757 |
| 9 | .0163 | −.4885 |
| 10 | −.1521 | −.3605 |
| 11 | −.2911 | −.2904 |
| 12 | −.3990 | −.2449 |

TABLE IV-2

BLADE CONTOUR COORDINATES

| No. | X-Basic | Y-Basic |
|---|---|---|
| 1 | −.3579 | .2183 |
| 2 | −.3328 | .2123 |
| 3 | −.1752 | .2603 |
| 4 | .0895 | .3752 |
| 5 | .1342 | .5880 |
| 6 | .0408 | .6523 |
| 7 | .0603 | .5716 |
| 8 | −.0487 | .3841 |
| 9 | −.2355 | .2821 |
| 10 | −.3564 | .2295 |

In one disclosed non-limiting dimensional embodiment, a turbine wheel diameter dimension Dd is 5.91 inches (150 mm) with the airfoil profile section set forth in Table I-1; Table II-1; Table III-1; and Table IV-1 respectively taken at a root dimension Dr of 2.39 inches (61 mm); inboard dimension Di of 2.56 inches (57 mm); main dimension Dm is 2.73 inches (69 mm); and tip dimension Dt is 2.90 inches (75 mm).

In another disclosed non-limiting dimensional embodiment, a turbine wheel diameter dimension Dd is 5.21 inches (132 mm) with the airfoil profile section set forth in Table I-2; Table II-2; Table III-2; and Table IV-2 respectively taken at a root dimension Dr of 2.12 inches (54 mm); inboard dimension Di of 2.27 inches (58 mm); main dimension Dm is 2.42 inches (61 mm); and tip dimension Dt is 2.57 inches (65 mm).

It should be understood that these representative sections are of one disclosed non-limiting embodiment and that other regions as well as intermediate region sections may be defined herefrom when connected by continuous smooth surfaces.

Figure 12:
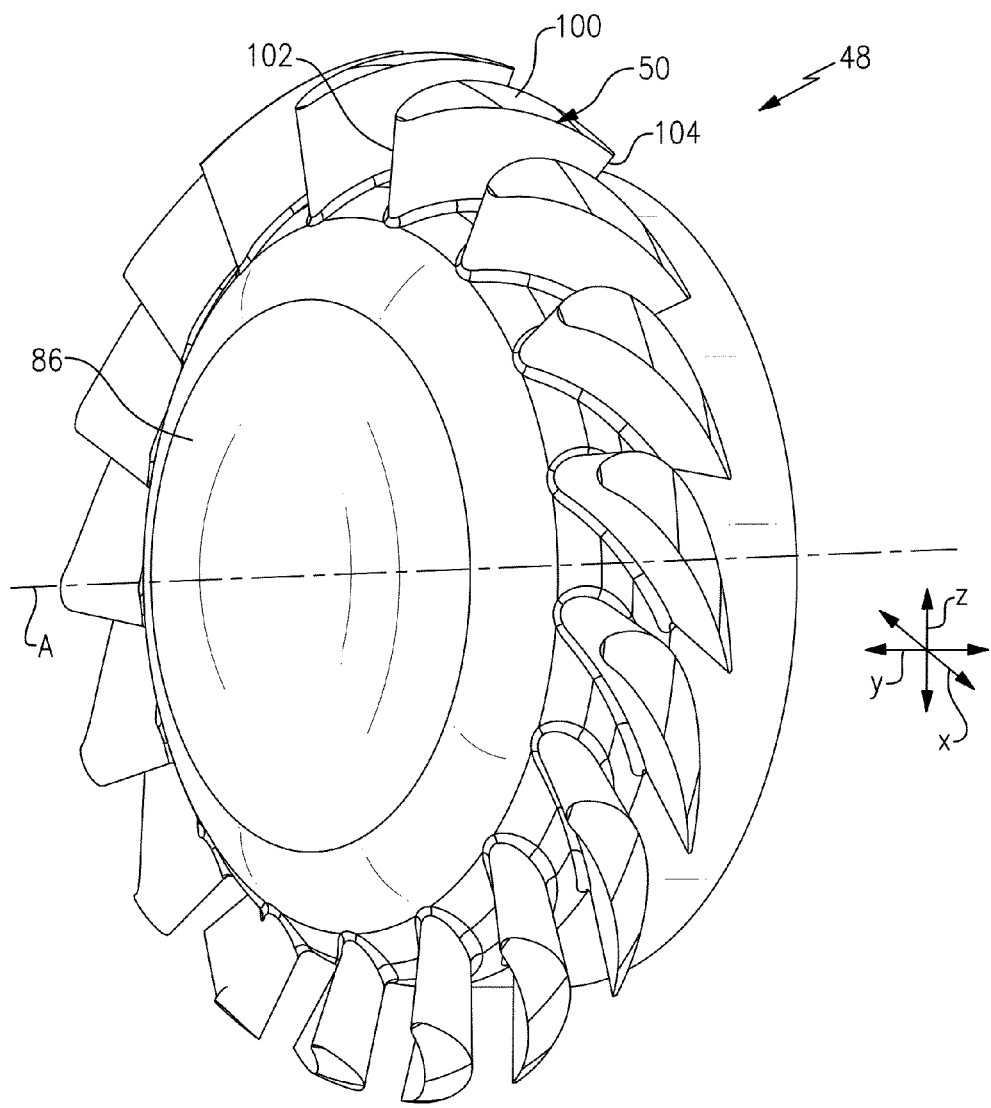
FIG. 12 is a perspective view of a nozzle of the inlet housing assembly for the ATS.

FIG. 5 illustrates a general perspective view of the turbine inlet housing assembly 44 (FIG. 11) located upstream of the turbine wheel 36. The inlet housing assembly 44 includes the inlet housing 46 which contains the nozzle 48 (FIGS. 12-14). That is, the inlet housing assembly 44 defines the inlet flowpath 54 into the turbine wheel 36.

With reference to FIG. 11, the turbine nozzle 48 includes a central dome shape 86 with the multiple of turbine vanes 50 which extend in a radial manner therefrom toward the inlet housing 46 and within the inlet flowpath 54.

FIG. 13 illustrates representative sections of the turbine vane 50 which include airfoil profile sections designated herein. The turbine vane 50 can generally be divided into a root region 90, an inboard region 92, a main region 94, an outboard region 96 and a tip region 98. The root, inboard, main, outboard and tip regions 90-98 define the span of the vane 50. As with the turbine blade as described above, the inspection sections define the radial span of the vane, but the solid model may include additional sections beyond the span for definition of the root region 90 and the tip region 98 and defines a vane radius V between the axis of rotation A and a distal vane tip end 100. It should be understood that various alternative or additional profile segments may be defined intermediate any of the sections defined herein when connected by a smooth surface. The vane 50 defines a leading edge 102 and a trailing edge 104, which define the chord of the vane 50.

Figure 15:
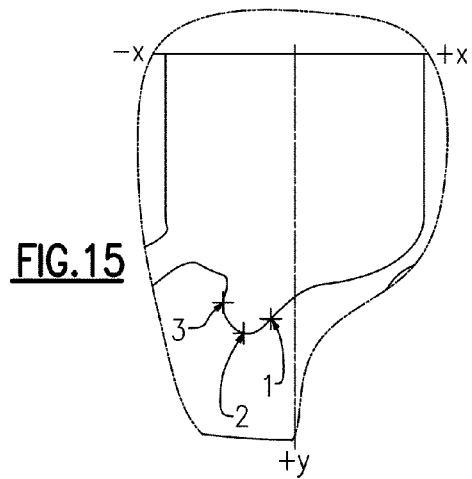
FIGS. 15-19 are profile sectional views of a nozzle vane of the nozzle.
Figure 16:
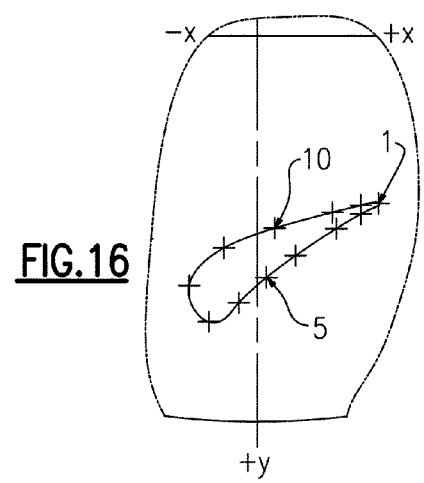
Figure 17:
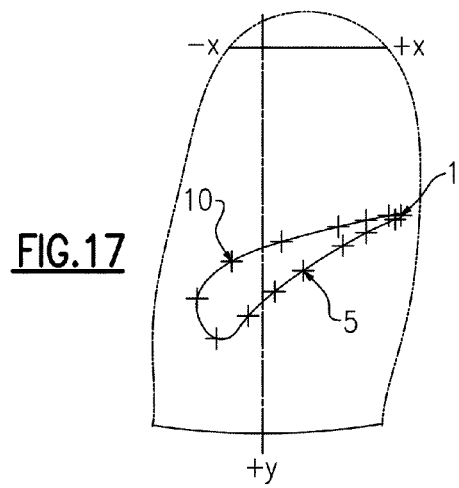
Figure 18:
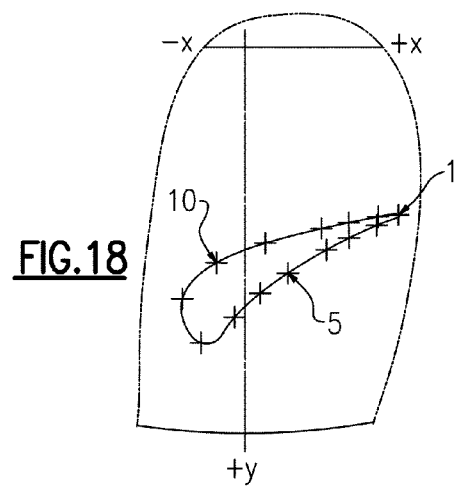

Because of the difficulty involved in giving an adequate word description of the particular vane airfoil profile section being described, coordinates for one non-limiting embodiment of the vane airfoil profile section are set forth in Table V-1; Table VI-1; Table VII-1; Table VIII-1; and Table IX-1 which represent sections taken within the root region 90 (FIG. 15), the inboard region 92 (FIG. 16), the main region 94 (FIG. 17), the outboard region 96 (FIG. 18) and the tip region 98 (FIG. 19) as generally discussed above with regard to each blade.

Figure 19:
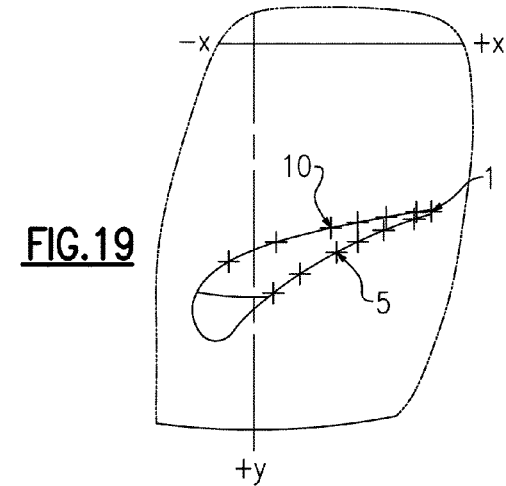

Another non-limiting embodiment of the vane airfoil profile section are set forth in Table V-2; Table VI-2; Table VII-2; Table VIII-2; and Table IX-2 which represent sections taken within the root region 90 (FIG. 15), the inboard region 92 (FIG. 16), the main region 94 (FIG. 17), the outboard region 96 (FIG. 18) and the tip region 98 (FIG. 19).

TABLE V-1

VANE CONTOUR COORDINATES

| No. | X-Basic | Y-Basic |
|---|---|---|
| 1 | −.1273 | 1.3936 |
| 2 | −.2689 | 1.4682 |
| 3 | −.3768 | 1.3074 |

TABLE V-2

VANE CONTOUR COORDINATES

| No. | X-Basic | Y-Basic |
|---|---|---|
| 1 | −.1105 | 1.2673 |
| 2 | −.2845 | 1.3034 |
| 3 | −.3594 | 1.1795 |

TABLE VI-2

VANE CONTOUR COORDINATES

| No. | X-Basic | Y-Basic |
|---|---|---|
| 1 | .5520 | .7893 |
| 2 | .5039 | .8256 |
| 3 | .4164 | .8721 |
| 4 | .2304 | .9979 |
| 5 | .0623 | 1.1419 |
| 6 | −.0772 | 1.2924 |
| 7 | −.2594 | 1.3287 |
| 8 | −.3329 | 1.2023 |
| 9 | −.1461 | .9905 |
| 10 | .1532 | .8856 |
| 11 | .4165 | .8136 |
| 12 | .5039 | .7916 |

TABLE VI-1

VANE CONTOUR COORDINATES

| No. | X-Basic | Y-Basic |
|---|---|---|
| 1 | .6371 | .8806 |
| 2 | .5446 | .9376 |
| 3 | .4149 | 1.0136 |
| 4 | .2010 | 1.1561 |
| 5 | .0473 | 1.2718 |
| 6 | −.0969 | 1.4041 |
| 7 | −.2541 | 1.5041 |
| 8 | −.3579 | 1.3140 |
| 9 | −.1749 | 1.1156 |
| 10 | .0924 | 1.0114 |
| 11 | .3953 | .9280 |
| 12 | .5438 | .8913 |

TABLE VII-1

VANE CONTOUR COORDINATES

| No. | X-Basic | Y-Basic |
|---|---|---|
| 1 | .7261 | .8825 |
| 2 | .6972 | .9043 |
| 3 | .5453 | .9743 |
| 4 | .4216 | 1.0423 |
| 5 | .2138 | 1.1731 |
| 6 | .0638 | 1.2834 |
| 7 | −.0749 | 1.4117 |
| 8 | −.2431 | 1.5303 |
| 9 | −.3436 | 1.3189 |
| 10 | −.1622 | 1.1246 |
| 11 | .0998 | 1.0212 |
| 12 | .3985 | .9422 |
| 13 | .5441 | .9085 |
| 14 | .6624 | .8830 |

TABLE VII-2

VANE CONTOUR COORDINATES

| No. | X-Basic | Y-Basic |
|---|---|---|
| 1 | .6268 | .7887 |
| 2 | .5789 | .8230 |
| 3 | .4914 | .8638 |
| 4 | .4095 | .9089 |
| 5 | .2497 | 1.0152 |
| 6 | .0820 | 1.1585 |
| 7 | −.0549 | 1.3093 |
| 8 | −.2424 | 1.3453 |
| 9 | −.3150 | 1.2176 |
| 10 | −.1377 | .9989 |
| 11 | .1658 | .8932 |
| 12 | .3860 | .8358 |
| 13 | .4914 | .8103 |
| 14 | .5788 | .7902 |

TABLE VIII-1

VANE CONTOUR COORDINATES

| No. | X-Basic | Y-Basic |
|---|---|---|
| 1 | .8057 | .8812 |
| 2 | .6909 | .9367 |
| 3 | .5458 | 1.0029 |
| 4 | .4268 | 1.0653 |
| 5 | .2249 | 1.1879 |
| 6 | .0789 | 1.2940 |
| 7 | −.0548 | 1.4187 |
| 8 | −.2322 | 1.5547 |

TABLE VIII-1-continued

VANE CONTOUR COORDINATES

| No. | X-Basic | Y-Basic |
|---|---|---|
| 9 | −.3302 | 1.3235 |
| 10 | −.1505 | 1.1328 |
| 11 | .1063 | 1.0298 |
| 12 | .4011 | .9535 |
| 13 | .5444 | .9220 |
| 14 | .6998 | .8906 |

TABLE VIII-2

VANE CONTOUR COORDINATES

| No. | X-Basic | Y-Basic |
|---|---|---|
| 1 | .7167 | .7880 |
| 2 | .6687 | .8204 |
| 3 | .5811 | .8560 |
| 4 | .4322 | .9310 |
| 5 | .2722 | 1.0351 |
| 6 | .1057 | 1.1784 |
| 7 | −.0277 | 1.3296 |
| 8 | −.2218 | 1.3648 |
| 9 | −.2931 | 1.2360 |
| 10 | −.1274 | 1.0090 |
| 11 | .1802 | .9012 |
| 12 | .4051 | .8461 |
| 13 | .5812 | .8069 |
| 14 | .6687 | .7887 |

TABLE IX-1

VANE CONTOUR COORDINATES

| No. | X-Basic | Y-Basic |
|---|---|---|
| 1 | .9321 | .8816 |
| 2 | .8420 | .9224 |
| 3 | .6824 | .9807 |
| 4 | .5464 | 1.0405 |
| 5 | .4341 | 1.0969 |
| 6 | .2416 | 1.2102 |
| 7 | .1024 | 1.3106 |
| 8 | −.1324 | 1.1455 |
| 9 | .1161 | 1.0430 |
| 10 | .4047 | .9689 |
| 11 | .5447 | .9397 |
| 12 | .6958 | .9111 |
| 13 | .8537 | .8842 |

TABLE IX-2

VANE CONTOUR COORDINATES

| No. | X-Basic | Y-Basic |
|---|---|---|
| 1 | .8215 | .7872 |
| 2 | .7735 | .8180 |
| 3 | .6860 | .8488 |
| 4 | .4578 | .9541 |
| 5 | .2980 | 1.0575 |
| 6 | .1336 | 1.2019 |
| 7 | −.2365 | 1.1229 |
| 8 | −.1152 | 1.0211 |
| 9 | .1964 | .9097 |
| 10 | .4263 | .8560 |
| 11 | .6860 | .8034 |
| 12 | .7735 | .7872 |

In one disclosed non-limiting dimensional embodiment, a turbine vane radius dimension Vr is approximately 3.0 inches (76 mm) with the airfoil profile section set forth in Table V-1; Table VI-1; Table VII-1; and Table VIII-1 respectively taken at a root dimension Vf at 2.21 inches (56 mm); inboard dimension Vi of 2.4 inches (60 mm); main dimension Vm is 2.5 inches (64 mm); outboard dimension Vo is 2.6 inches (67 mm) and tip dimension Vt is 2.8 inches (71 mm).

In another disclosed non-limiting dimensional embodiment, a turbine vane radius dimension Vr is approximately 2.61 inches (66 mm) with the airfoil profile section set forth in Table V-2; Table VI-2; Table VII-2; and Table VIII-2 respectively taken at a root dimension Vf at 1.95 inches (50 mm); inboard dimension Vi of 2.1 inches (53 mm); main dimension Vm is 2.2 inches (56 mm); outboard dimension Vo is 2.32 inches (59 mm) and tip dimension Vt is 2.46 inches (62 mm).

Figure 20:
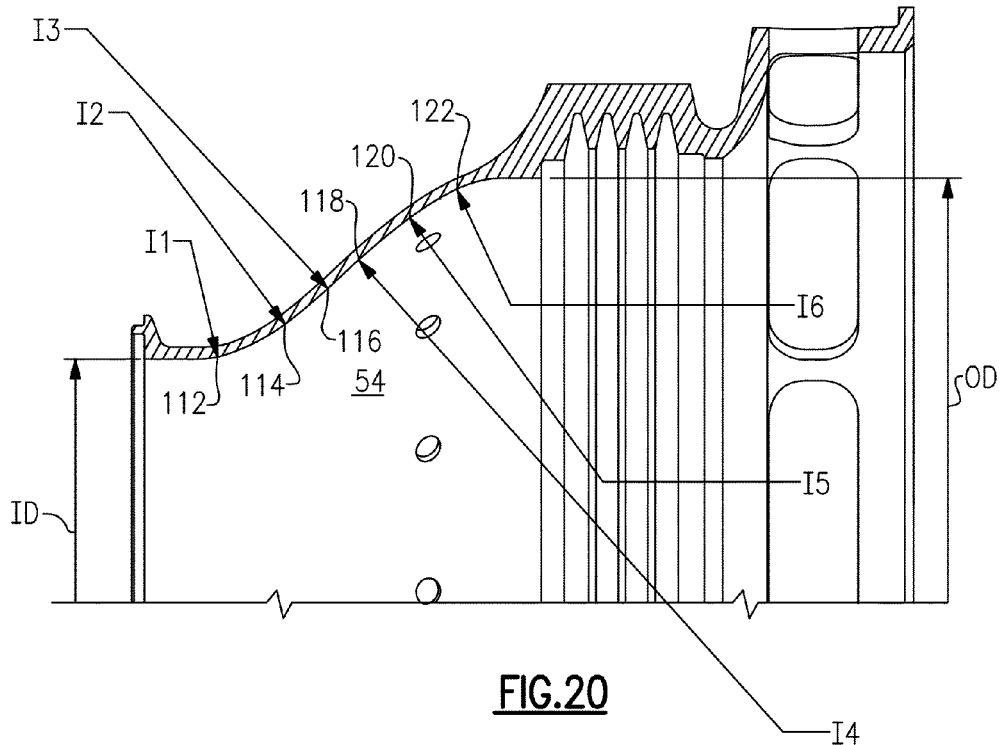
FIG. 20 is a sectional side view of an inlet housing.
Figure 21:
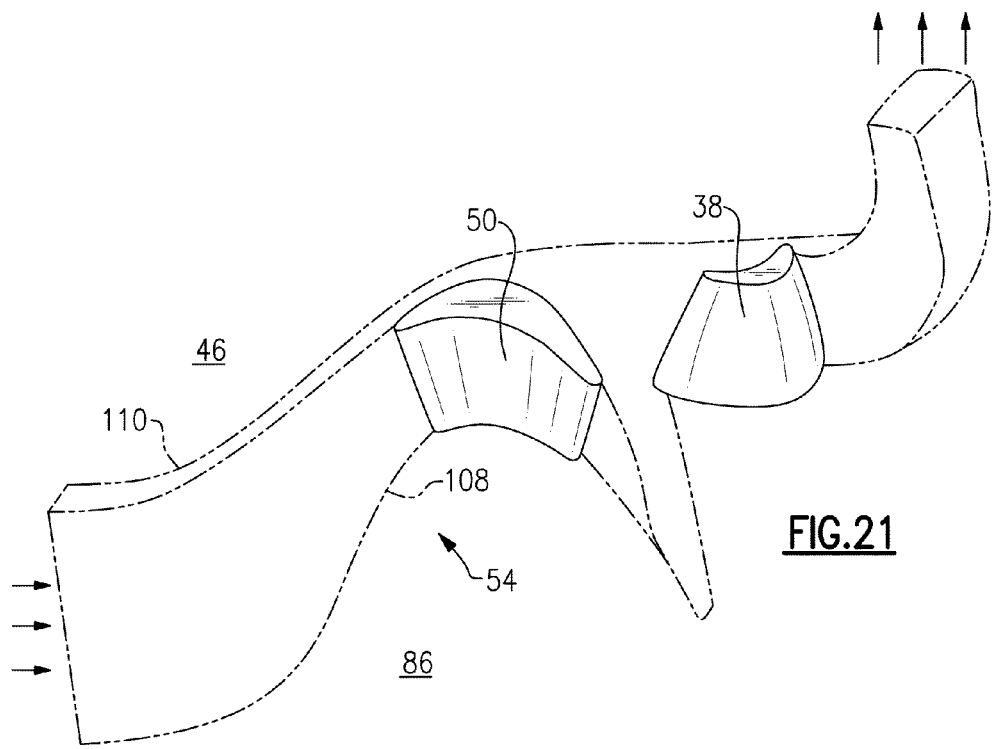
FIG. 21 is a schematic view of an inlet flowpath of the inlet housing assembly.

With reference to FIG. 20, the inlet flowpath 54 is defined between the inlet housing 46 and the central dome shape 86 upstream of the plurality of vanes 50 (FIG. 21). If the inlet flowpath turns too sharply, the air flow may separate from the inlet housing surface, which results in recirculation and lost energy.

The shape of the inlet flowpath 54 is defined using, for example, computational fluid dynamics (CFD) analytical software and is optimized to meet the specific performance requirements of the applicable ATS. This optimization results in an inlet flowpath which distributes the air flow uniformly to the annular entrance to the nozzle vanes 50. With an optimized inlet flowpath 54, the distribution of the inlet air from the cylindrical inlet duct to the annular nozzle inlet minimizes energy losses due to flow disturbances or recirculation of the air along the inlet flowpath. It should be understood that additional constraints, such as limits in axial length of the ATS may alternatively or additionally be considered for optimization of the inlet flowpath. The same process can be used to create a uniquely optimized inlet flowpath to meet different starter performance requirements or the inlet flowpath shape can be scaled up or scaled down to meet different starter performance requirements.

Characteristics of the inlet flowpath 54 shape can change from one ATS to another and may include, but are not limited to, inlet duct diameter, radial height, axial length, radius of curvature of the defining curves, etc. The shapes of the inlet flowpath inner and outer surfaces are dimensionally defined by a set of points through which smooth curves are drawn, one for the inner flowpath and one for the outer flowpath. Three dimensional definition is then accomplished by revolving the inner flowpath curve and the outer flowpath curve about the centerline of the air inlet. The inner and outer flowpath curves can each be defined by a set of tangent arcs and lines, followed by rotation about the inlet centerline to create the flowpath surfaces. It should be understood that the flowpath curves may be defined by a set of Cartesian coordinates through which a smooth curve is drawn. An outer flowpath curve 110 of the inlet flowpath 54 is defined by a multiple of arcuate surfaces in cross-section. The multiple of arcuate surfaces may include a blend of a first convex arcuate surface 112, a second convex arcuate surface 114 a third convex arcuate surface 116, a first concave arcuate surface 118, a second concave arcuate surface 120 and a third concave arcuate surface 122 with respect to the inlet flowpath 54. The multiple of arcuate surfaces are defined between an inlet diameter dimension ID and an outlet diameter dimension OD which extend along an inlet flowpath length IL.

In one disclosed non-limiting dimensional embodiment, the first convex arcuate surface 112 defines a radius dimension I-1 of 0.6 inches (15 mm), the second convex arcuate surface 114 defines a dimension I-2 of 1.5 inches (38 mm), the third convex arcuate surface 116 defines a radius dimension I-3 of 4.3 inches (109 mm), the first concave arcuate surface 118 defines a radius dimension I-4 of 5.5 inches (140 mm), the second concave arcuate surface 120 defines a radius dimension I-5 of 2.3 inches (58 mm) and the third concave arcuate surface 122 defines a radius dimension I-6 of 0.9 inches (23 mm) between the inlet diameter dimension ID of 3.4 inches (86 m) and an outlet diameter dimension OD of 5.9 inches (150 mm) which extend along a flowpath length IL which in the disclosed non-limiting embodiment is approximately 2.9 inches (74 mm). It should be understood that the origin of each radius dimension may be displaced to provide a smooth interface between each radius dimension.

Figure 23:
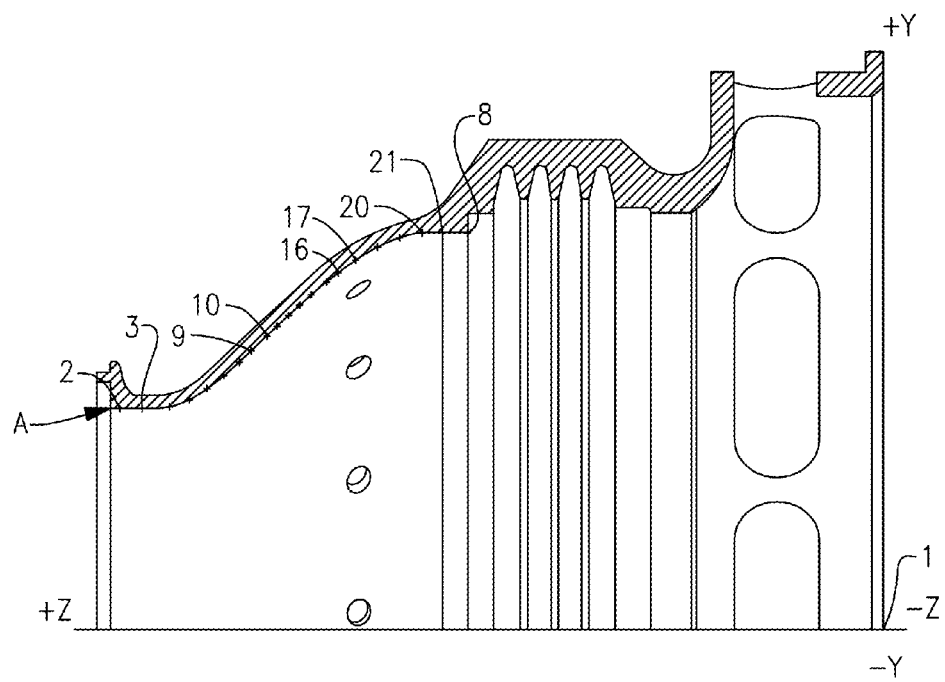
FIG. 23 is a sectional side view of an inlet housing according to an alternate dimensional embodiment in which the flowpath is defined by coordinates in Table XI.

In another disclosed non-limiting dimensional embodiment, the outer flowpath curve 110 of the inlet flowpath 54 (FIG. 23) is defined by the coordinates of Table XI:

TABLE XI

COORDINATES

| No. | Z-Basic | Y-Basic |
|---|---|---|
| 1 | .0000 | .0000 |
| 2 | 4.9483 | 1.4500 |
| 3 | 4.8042 | 1.4500 |
| 4 | 4.6600 | 1.4500 |
| 5 | 4.5343 | 1.4817 |
| 6 | 4.4143 | 1.5491 |
| 7 | 4.3043 | 4.6345 |
| 8 | 4.2043 | 1.7256 |
| 9 | 4.1143 | 1.8139 |
| 10 | 4.0243 | 1.9041 |
| 11 | 3.9543 | 1.9731 |
| 12 | 3.8758 | 2.0469 |
| 13 | 3.8052 | 2.1116 |
| 14 | 3.7169 | 2.1094 |
| 15 | 3.6198 | 2.2725 |
| 16 | 3.5228 | 2.3492 |
| 17 | 3.4080 | 2.4305 |
| 18 | 3.2845 | 2.5051 |
| 19 | 3.1345 | 2.5751 |
| 20 | 2.9491 | 2.6140 |
| 21 | 2.8521 | 2.6140 |

It should be understood that Table XI provides a slightly different dimensioning scheme which does not use curves and lines but points and curve fit through those points but the end result is still a similar shape in concept as described above by the convex and concave surfaces.

Figure 22:
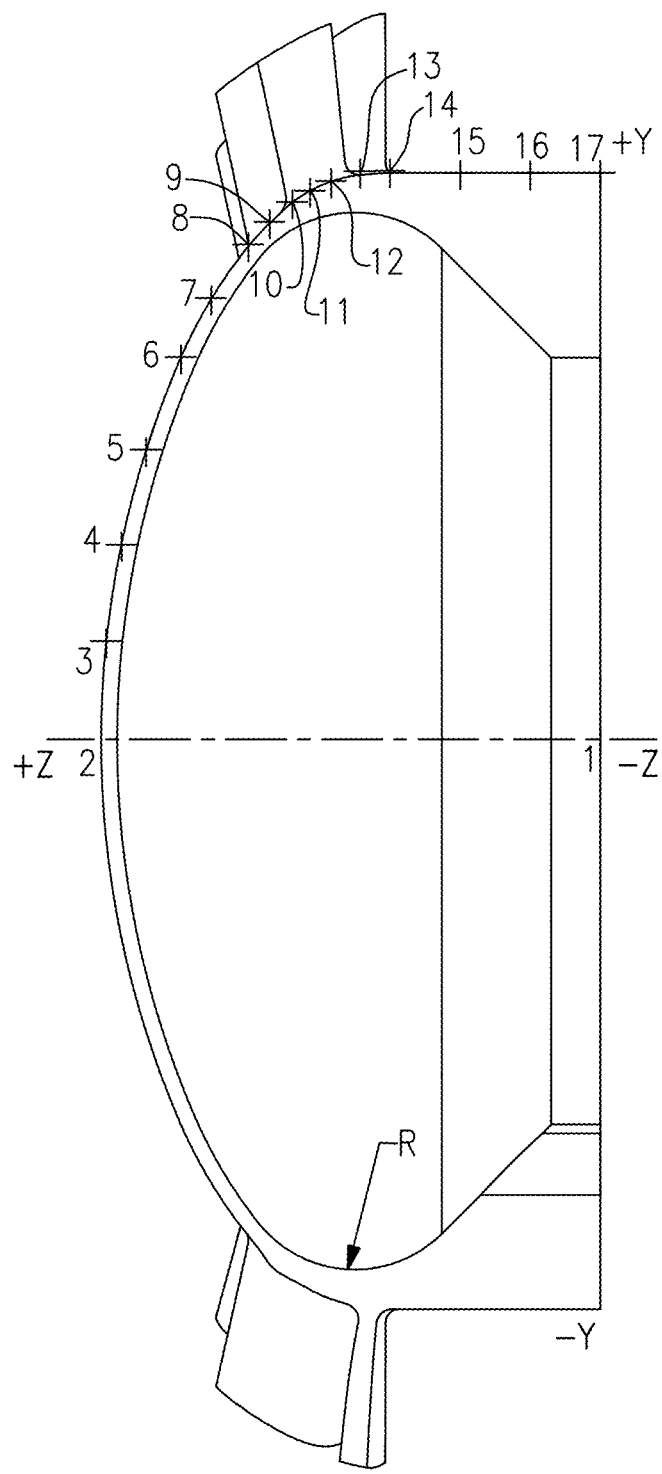
FIG. 22 is a sectional view of a nozzle of the of the inlet housing assembly.

The inner flowpath curve 108 of the inlet flowpath 54 is defined by the central dome shape 86. Because of the difficulty involved in giving an adequate word description of the particular central dome shape 86 being described, coordinates for one non-limiting dimensional embodiment of the central dome shape 86 (FIG. 22) is set forth in Table X-1. Another non-limiting dimensional embodiment of the central dome shape 86 (FIG. 22) is set forth in Table X-2.

TABLE X-1

HUB CONTOUR COORDINATES

| No. | Z-Basic | Y-Basic |
|---|---|---|
| 1 | .0000 | .0000 |
| 2 | .0000 | 2.0298 |
| 3 | .3985 | 2.0095 |
| 4 | .7928 | 1.9488 |
| 5 | 1.1789 | 1.8482 |
| 6 | 1.5529 | 1.7091 |
| 7 | 1.7925 | 1.5859 |
| 8 | 2.0135 | 1.4317 |
| 9 | 2.1054 | 1.3479 |

TABLE X-1-continued

HUB CONTOUR COORDINATES

| No. | Z-Basic | Y-Basic |
|---|---|---|
| 10 | 2.1862 | 1.2533 |
| 11 | 2.2344 | 1.1778 |
| 12 | 2.2706 | 1.0958 |
| 13 | 2.3016 | .9765 |
| 14 | 2.3120 | .8535 |
| 15 | 2.3120 | .5690 |
| 16 | 2.3120 | .2845 |
| 17 | 2.3120 | .0000 |

TABLE X-2

HUB CONTOUR COORDINATES

| No. | Z-Basic | Y-Basic |
|---|---|---|
| 1 | .0000 | .0000 |
| 2 | 1.8235 | .0000 |
| 3 | 1.7819 | .5263 |
| 4 | 1.7226 | .8154 |
| 5 | 1.6931 | .9247 |
| 6 | 1.6661 | 1.0131 |
| 7 | 1.6163 | 1.1603 |
| 8 | 1.5881 | 1.2355 |
| 9 | 1.5545 | 1.3177 |
| 10 | 1.4862 | 1.4648 |
| 11 | 1.4461 | 1.5401 |
| 12 | 1.4031 | 1.6133 |
| 13 | 1.3117 | 1.7469 |
| 14 | 1.2564 | 1.8139 |
| 15 | 1.2388 | 1.8330 |
| 16 | 1.1505 | 1.9141 |
| 17 | 1.0624 | 1.9727 |
| 18 | .9739 | 2.0094 |
| 19 | .8859 | 2.0307 |
| 20 | .5150 | 2.0403 |
| 21 | .0738 | 2.0403 |
| 22 | 1.3798 | 2.3492 |
| 23 | 1.2650 | 2.4305 |
| 24 | 1.1415 | 2.5051 |
| 25 | .9915 | 2.5751 |
| 26 | .8061 | 2.6140 |

Since the ATS is non-functional weight after the engine is started, it is desirable to maximize the efficiency of the ATS to reduce the weight and size of the ATS and increase aircraft payload. Maximum efficiency occurs when an optimized blade profile is matched with an optimized nozzle vane profile and an optimized inlet flowpath shape.

Optimized torque output performance of the ATS as a result of the optimized aerodynamic performance results in a reduction in ATS size to facilitate a reduced starter weight since the optimized rotor will be the smallest rotor for a given gear ratio in the ATS. This provides for smaller and lower weight turbine containment features as well as reduced packaging space for other external components such as tubes and ducts to thereby further reduce overall engine weight.

It should also be appreciated that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An inlet housing assembly for an Air Turbine Starter comprising:
an outer flowpath curve of an inlet flowpath defined by a multiple of arcuate surfaces in cross-section; and
an inner flowpath curve of said inlet flowpath defined by a central dome shape, wherein said central dome shape is defined by Table X scaled by a desired factor.

2. The inlet housing assembly for an Air Turbine Starter as recited in claim 1, wherein said multiple of arcuate surfaces in cross-section include:
a first convex arcuate surface;
a second convex arcuate surface downstream of said first convex arcuate surface;
a third convex arcuate surface downstream of said second convex arcuate surface;
a first concave arcuate surface downstream of said third convex arcuate surface;
a second concave arcuate surface downstream of said first concave arcuate surface; and
a third concave arcuate surface downstream of said second concave arcuate surface.

3. The inlet housing assembly for an Air Turbine Starter as recited in claim 1, further comprising a multiple of turbine vanes which radially extend from said central dome shape toward said inlet housing.

4. An inlet housing assembly for an Air Turbine Starter comprising:
an inlet housing which defines an outer flowpath curve of an inlet flowpath, said outer flowpath curve defined at least partially by a multiple of arcuate surfaces in cross-section; and
a nozzle which defines an inner flowpath curve of said inlet flowpath, said inner flowpath curve at least partially defined by a central dome shape, wherein said central dome shape is defined by Table X scaled by a desired factor.

5. The inlet housing assembly for an Air Turbine Starter as recited in claim 4, wherein said multiple of arcuate surfaces in cross-section include:
a first convex arcuate surface;
a second convex arcuate surface downstream of said first convex arcuate surface;
a third convex arcuate surface downstream of said second convex arcuate surface;
a first concave arcuate surface downstream of said third convex arcuate surface;
a second concave arcuate surface downstream of said first concave arcuate surface; and
a third concave arcuate surface downstream of said second concave arcuate surface.

6. An Air Turbine Starter comprising:
a turbine rotor;
an inlet housing which at least partially surrounds said turbine rotor to define an outer flowpath curve of an inlet flowpath in communication with said turbine rotor, said outer flowpath curve defined at least partially by a multiple of arcuate surfaces in cross-section; and
a nozzle upstream of said turbine rotor, said nozzle defines an inner flowpath curve of said inlet flowpath in communication with said turbine rotor, said inner flowpath curve at least partially defined by a central dome shape, wherein said central dome shape is defined by Table X scaled by a desired factor.

7. The Air Turbine Starter as recited in claim 6, wherein said multiple of arcuate surfaces in cross-section include:
a first convex arcuate surface;
a second convex arcuate surface downstream of said first convex arcuate surface;
a third convex arcuate surface downstream of said second convex arcuate surface;
a first concave arcuate surface downstream of said third convex arcuate surface;
a second concave arcuate surface downstream of said first concave arcuate surface; and
a third concave arcuate surface downstream of said second concave arcuate surface.

8. The Air Turbine Starter as recited in claim 6, further comprising a multiple of turbine vanes which extend in a radial manner from said central dome shape, each of said multiple of turbine vanes extend from said central dome shape to define an airfoil profile section through a leading edge and a trailing edge, said airfoil profile section defined by a set of X-coordinates and Y-coordinates defined in any of Table V; Table VI; Table VII; Table VIII; or Table IX scaled by a desired factor, said X-coordinate is the tangential direction, and said Y-coordinate is the axial direction.

9. A method of assembling an Air Turbine Starter comprising:
fixing a turbine nozzle that includes a central dome shape with a multiple of turbine vanes which extend in a radial manner therefrom into an inlet housing; and
rotationally mounting a turbine rotor into said inlet housing downstream of the turbine nozzle, the inlet housing at least partially surrounds the turbine rotor, the inlet housing defines an outer flowpath curve of an inlet flowpath in communication with the turbine rotor, the outer flowpath curve defined at least partially by a multiple of arcuate surfaces in cross-section, the nozzle defines an inner flowpath curve of the inlet flowpath in communication with the turbine rotor, the inner flowpath curve at least partially defined by the central dome shape, wherein the central dome shape is defined by Table X scaled by a desired factor.

* * * * *